United States Patent Office 3,016,784
Patented Jan. 16, 1962

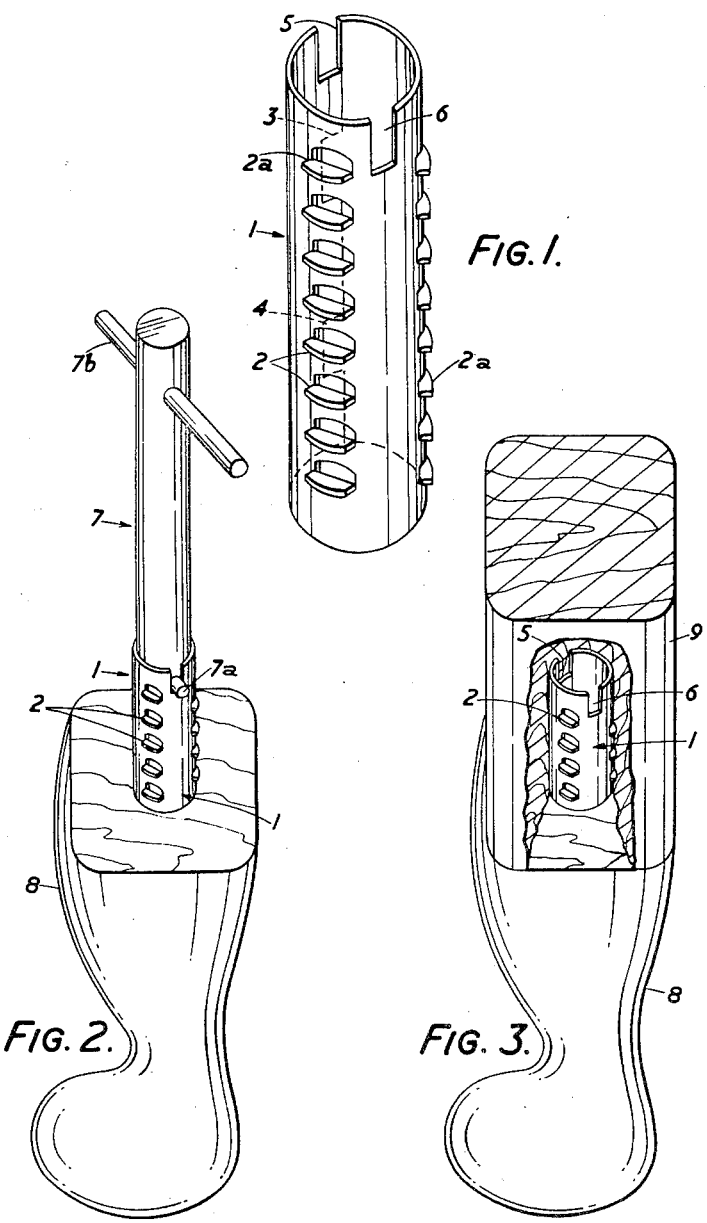

3,016,784
SELF-THREADING SHEET METAL FASTENING DEVICE
Leslie Parkin, Bobbers Hill, and William Henry Brealey, Sandiacre, England, assignors to United-Carr Fastener Corporation, New Castle, Del., a corporation of Delaware
Filed May 14, 1959, Ser. No. 813,285
Claims priority, application Great Britain May 23, 1958
1 Claim. (Cl. 85—47)

This invention relates to fastening devices for securing two members to one another and more especially although not exclusively to fastening devices for use in securing parts of an article of furniture such as a foot or arm to the frame of a chair or other article of furniture.

It is an object of the invention to provide an improved fastening device for enabling two members to be readily secured to one another.

According to the present invention a fastening device for securing two members to one another comprises a cylindrical body having a series of separate teeth projecting from its external surface, the said teeth being formed so as to lie on a helical path about the longitudinal axis of the cylindrical body.

The fastening device may be formed from sheet metal which is bent to a cylindrical shape and which has a series of teeth each separately sheared out of the sheet metal. One or more keys and co-operating key receiving recesses may be provided along the longitudinally disposed abutting side edges of the sheet to prevent the body becoming distorted during the screwing operation.

The first tooth of the helix at each end of the fastening device may have a chisel shaped leading edge which forms a thread cutting surface.

Axially extending slots may be provided at one or both ends of the cylindrical body to locate a handtool used to rotate the fastening device to screw it into the member which is to be secured.

One embodiment of the present invention will now be described, by way of example only, with reference to the accompanying drawing, in which, FIG. 1 is a perspective view of a fastening device, FIG. 2 is a similar view of the fastening device being screwed into a wooden member, and FIG. 3 is a similar view of a second wooden member being screwed onto the fastening device.

With reference to the accompanying drawing, a fastening device 1 is formed from a piece of sheet metal which has a series of teeth 2 separately sheared out of the metal substantially at right angles to the surface of the metal, the teeth 2 being spaced circumferentially and longitudinally and being cut in such a way so that, when the piece of sheet metal has been bent into the form of a cylinder to form the cylindrical body of the fastening device 1, the teeth 2 lie along a helical path, and axis of the helix being the longitudinal axis of the cylindrical body. The tooth 2a nearest each end of the fastening device has its edge nearest the respective end chamfered to a chisel-like shape to form a sharp thread cutting surface.

One longitudinal side edge of the cylindrical body has two lateral keys 3, 4 spaced longitudinally and engaging in recesses in the opposite side edge to locate the abutting edges and prevent distortion during use of the fastening device yet to be described.

At one end of the cylinder are two diametrically opposite axial slots 5, 6 extending inwardly from the end of the body and onto which an appropriately shaped hand tool 7 may be inserted to rotate the fastening device 1.

In securing, for example, a wooden table leg 8 to an underside member 9 of a wooden table by means of the fastening device 1, a hole is drilled in both the table leg and the member 9 each hole having a diameter equal to the diameter of the external surface of the cylindrical body of the fastening device and a depth approximately equal to half the length of the fastening device.

The fastening device 1 is screwed into the hole in the leg 8 using the hand tool 7 comprising lateral pins 7a and tommy bar 7b, the pins 7a being located in the two diametrically opposite slots 5, 6. As the fastening device 1 is being screwed into the hole, the chisel-shaped edge of the leading tooth 2a cuts a thread in the wood through which the following teeth pass.

When the end of the fastening device 1 has reached the bottom of the hole in the leg approximately half the length of the device will remain protruding from the surface of the leg.

The projecting end of the fastening device 1 is presented to the hole in the member 9 and the leg rotated. The leading tooth 2a of the projecting end cuts a thread in the hole in the member 9 and the leg 8 is rotated until it abuts the underside of the member 9.

As the pitch of the helix formed by the teeth 2 may be easily determined, a table leg having an asymmetrical shape may be readily screwed in its correct position by measuring the length of the fastening device protruding from the leg and commencing to screw on the leg at the appropriate predetermined position. For example, with a pitch of four threads per inch and with one inch of the fastening device protruding from the leg, four full turns of the leg are required to bring the leg into abutting relationship with the underside of the table, so that if the leg is correctly aligned with the table when commencing the four turns it will also be correctly aligned at the completion of the four turns.

It will be understood that by reversing the procedure described above, the table leg may be separated from the table when necessary.

While the fastener has been specifically described for securing a leg to a table, it is not limited in this respect, but may be used for securing a foot support, arm or other part to an article of furniture or a part thereof or for securing any two members to one another.

Further, the fastening device is not limited to securing parts made of wood but the parts may be made of synthetic plastic or other material in which the teeth can cut a thread.

For heavy duty application the fastening device may be reinforced by inserting an inner tubular sleeve or solid rod.

We claim:
A rotatable self-threading fastening device for securing two members to one another comprising a relatively rigid sheet metal cylindrical body having a series of separate teeth projecting from its external surface, the said teeth being formed so as to lie on a helical path about the longitudinal axis of the cylindrical body and at least the first tooth being chisel-shaped at its leading edge to start self-threading of the fastening device into engagement with a member to be fastened, said teeth being of greater circumferential length than radial depth, and sheared from the body and bent outwardly about the base of the teeth.

References Cited in the file of this patent
UNITED STATES PATENTS

| | | |
|---|---|---|
| 168,357 | Uster | Oct. 5, 1875 |
| 186,503 | Snook | Jan. 23, 1877 |
| 906,079 | Stevens | Dec. 8, 1908 |
| 1,354,549 | Gilmer | Oct. 5, 1920 |
| 1,410,043 | Webster | Mar. 21, 1922 |
| 2,110,959 | Lombard | Mar. 15, 1938 |
| 2,549,393 | Siesel | Apr. 17, 1951 |
| 2,584,723 | Mackey | Feb. 5, 1952 |
| 2,823,574 | Rosan | Feb. 18, 1958 |